United States Patent [19]

Dench et al.

[11] 3,909,280

[45] Sept. 30, 1975

[54] ETHYLENE-ACRYLIC ACID-VINYL ACETATE TERPOLYMER TELOMER WAXES

[75] Inventors: John E. Dench, Dover; Harry Knutson, Brookside; Manfred K. Seven, Long Valley, all of N.J.

[73] Assignee: Allied Chemical Corporation, New York, N.Y.

[22] Filed: July 9, 1971

[21] Appl. No.: 161,320

[52] U.S. Cl. ............................. 106/271; 260/80.8
[51] Int. Cl.$^2$ ................... C08L 91/06; C09D 3/387
[58] Field of Search ....... 260/80.8, 29.6 H; 106/271

[56] References Cited

UNITED STATES PATENTS

| 3,201,374 | 8/1965 | Simms | 260/80.8 |
| 3,215,678 | 11/1965 | Adelman | 260/80.8 |
| 3,306,882 | 2/1967 | Pullen | 260/28.5 AV |
| 3,647,733 | 3/1972 | McDonald | 260/28.5 AV |

*Primary Examiner*—Theodore Morris
*Attorney, Agent, or Firm*—Gerhard H. Fuchs; Michael S. Jarosz

[57] ABSTRACT

Ethylene-acrylic acid-vinyl acetate telomer waxes form clear, stable emulsions useful in floor polish formulations.

9 Claims, No Drawings

[3,909,280]

ETHYLENE-ACRYLIC ACID-VINYL ACETATE TERPOLYMER TELOMER WAXES

This invention relates to novel ethylene terpolymer telogen waxes. More particularly, this invention relates to ethylene-acrylic acid-vinyl acetate terpolymer telomer waxes which form stable emulsions.

BACKGROUND OF THE INVENTION

The production of various grades of ethylene polymer and copolymer telomer waxes in the presence of a free radical initiator at elevated temperatures and pressures has been commercially practiced for many years. These products are disclosed in U.S. Pat. Nos. 2,504,100, 2,683,141 and 2,712,534 for example. These waxes have viscosities of 25–1500 centipoises at 140°C., molecular weight of 1000–5000 and softening points (Ring and Ball) of 70°–118°C. Melt index of these waxes cannot be determined due to their impractically high measurements. These waxes are useful in preparing polishes for floor care. However their stability in certain emulsions has not been fully satisfactory. On standing they coagulate, greatly reducing the clarity of the polish formulations and reducing "leveling," which is a measure of the ability of the polish to form an even coating on the floor surface.

SUMMARY OF THE INVENTION

We have discovered that ethylene terpolymer telomer waxes of ethylene, acrylic acid and vinyl acetate can be prepared containing from 2 to 7, preferably 3–4 mol % of acrylic acid, and 0.5 to 8, preferably 3–5 mol % of vinyl acetate, both amounts based on ethylene, which have surprising and outstanding emulsion stability and can be formulated to prepare acrylic latex floor polishes having improved properties. These waxes are prepared by charging the monomers, a telogen and a free radical initiator and polymerizing at elevated temperatures and pressures.

DETAILED DESCRIPTION OF THE INVENTION

The terpolymer telomer waxes of the invention are prepared by charging ethylene, acrylic acid, vinyl acetate, a telogen and a free radical initiator in the vapor phase to a suitable reactor at temperatures of from about 140° to 200°C. and pressures of from about 5000 to 10,000 psi in known manner. Once equilibrium has been established in the reactor, the product is continually withdrawn from the bottom of the reactor as it is formed. Processes for preparing the wax products are more fully described in U.S. Pat. No. 3,658,741 and our copending U.S. application "Improved Processes for Preparing Ethylene Polymer Telomer Waxes" Ser. No. 120,356, filed Mar. 2, 1971.

Free radical initiators suitable for use in the invention include peroxy and azo initiators such as hydrogen peroxide, acetyl peroxide, diethyl peroxide, lauroyl peroxide, benzoyl peroxide, cumene hydroperoxide, t-butyl hydroperoxide, di-t-butyl peroxide, t-butyl peracetate, t-butyl peroctoate, azobisisobutyronitrile, 1-cyano-1-(t-butylazo)cyclohexane, 2-(t-butylazo)isobutyronitrile, and 2-t-butylazo-2-phenylpropane. The amount of initiator to be added will vary with the production rate desired, but generally from $1.3 \times 10^{-4}$ to $4 \times 10^{-4}$ mols of initiator per mol of the monomer mixture will give excellent results.

The telogen acts both as a chain transfer agent and terminating agent. Suitable telogens are conventional and include compounds containing carbon, hydrogen, and oxygen free of olefinic unsaturation, which have boiling points below about 200°C. at atmospheric pressure, preferably below about 150°C. Preferred telogens contain up to four carbon atoms and up to two oxygen atoms. Illustrative of suitable telogens are alcohols such as methanol, ethanol, n-propanol, isopropanol, the butanols, cyclohexanol, diacetone alcohol and the like; ethers such as dimethyl ether, diethyl ether, diisopropyl ether and the like; ketones such as acetone, methyl ethyl ketone, isobutyl ketone, cyclohexanone and the like; esters such as methyl formate, propyl formate, ethyl acetate, methyl propionate, ethyl butylate, methyl malonate, triethyl orthoformate and the like; acids such as acetic acid, propionic acid or butyric acid and their corresponding anhydrides; compounds such as acetaldehyde, ethylene oxide, polyethylene oxide, dioxolane, dioxane, ethyl acetal, lactones, furanes, glycol diacetate and the like. Higher molecular weight aromatic hydrocarbon compounds can also be employed such as toluene, ethylbenzene, cumene, n-propylbenzene, amylbenzene, and the like. Isopropanol and acetone are especially preferred. The amount of telogen added can vary between about 10 to 60%, preferably about 12 to 28%, by weight of ethylene, but the concentration should remain substantially constant i.e., ± 1%, once equilibrium has been established within the reactor.

The reactants are fed to the reactor under suitable pressures which can be from 5000 to 10,000 psi. Pressures of from 6000 to 8000 psi are preferred.

The temperature of the reactor must be carefully regulated. If the temperature is too low, the production rate will be impractically low whereas if the temperature is too high, undue branching of the polymer chains will result. Suitable reaction temperatures are from 140° to 200°C., preferably 145° to 170°C. The temperature of reaction will also be chosen on the basis of initiator activity, as is known.

The preferred procedure for preparing hard ethylene polymer/telomer waxes is conventional and is generally described in U.S. Pat. No. 2,683,141. An autoclave or tank-type reactor fitted with suitable agitation means and cooling means is brought to the desired temperature with steam. The pressure in the reactor is brought up to the desired operating pressure. The injection pumps are then started to deliver the required amounts of ethylene, telogen, initiator and comonomers to the upper part of the reactor and the off gas flow is started. After an initial induction period, the wax product is removed from the reactor along with the off gas, is collected in a receiving vessel and passed through a deodorizer to storage.

The waxes of the invention are readily emulsifiable in conventional manner to give clear, stable emulsions. They are homogeneous, meaning the polymer products are essentially free of ethylene homopolymer or ethylene copolymers; they have molecular weights in the range between about 2000 to 5000 and viscosity of from about 100 to 1500 centipoises at 140°C. The preferred products of the invention have viscosities of 200 to 600 centipoises at 140°C.

The invention will be further illustrated by the following examples, but it is to be understood that the invention is not meant to be limited to the details therein. In the examples, parts and percentages are by weight. Hardness is determined according to ASTM test D 1321-55T using an NBS certified D1321 needle.

In the Examples, ethylene of at least 99% purity and isopropanol of at least 99.8% purity as telogen were employed. The following procedure was used for the start-up of each run: (a) the reactor was brought to operating temperature with steam; (b) the pressure was brought up to about 3000 psi with ethylene, and an initial injection of isopropanol was pumped in; (c) the pressure was increased with ethylene to operating pressure; (d) high pressure injection pumps were started to deliver the required amounts of isopropanol and initiator dissolved in isopropanol; (e) the reactor let-down control valve for off gas flow was opened; (f) downstream equipment including scrubbers, off gas coolers and the like were put in operation; (g) after a brief induction period wax product started to form, the deodorizer was started and sampling begun on an hourly basis; (h) steady state conditions were achieved after 2–4 hours.

EXAMPLE 1

Ethylene-acrylic acid-vinyl acetate isopropanol telomer waxes were prepared at 7000 psi and 165°C. containing 3.5% acrylic acid and 4.1% vinyl acetate. Other operating conditions and results are summarized below:

photoelectric colorimeter at room temperature. Results are given below:

| Run No. | Optical Density |
|---|---|
| 1 | 120 |
| 2 | 24 |
| 3 | 70 |

Stability of the emulsions in a polish formulation was determined by stirring 10 parts of the emulsions as prepared above with 90 parts of a clear latex polish without wax having a pH of 9.1 (available as "Future", a trademark of S. C. Johnson & Son., Inc.) and measuring the initial optical density and final optical density measured after incubation for 30 days at 125°F. at varying pH.

| | pH | | | | | | | |
|---|---|---|---|---|---|---|---|---|
| | 8.0 | | 8.5 | | 8.7 | | 9.5 | |
| Run No. | initial | final | initial | final | initial | final | initial | final |
| 1 | — | — | 39 | 67 | 41 | 135 | — | — |
| 2 | 29 | 40 | 30 | 51 | 29 | 283 | 385 | (a) |
| 3 | — | — | 34 | 53 | 34 | 114 | — | — |

(a) separated after 3 days

| Run No. | Catalyst | Ethylene Feed, lbs./hr. | Isopropanol, % based on ethylene feed | Catalyst Feed, mols/hr. | Production Rate, lbs/hr. | Hardness 0.1mm |
|---|---|---|---|---|---|---|
| 1. | t-butyl-peracetate | 2.39 | 22.5 | 0.0094 | 1.49 | 4.2 |
| 2. | di-t-butyl-peroxide | 1.70 | 21.5 | 0.0054 | 1.10 | 8.5 |

EXAMPLE 2

Various ethylene-acrylic acid-vinyl acetate isopropanol telomer waxes were prepared at 7000 psi and 165°C. Other operating conditions and results are summarized below.

EXAMPLE 4

The procedure of Example 3 was repeated substituting as the wax an ethylene-acrylic acid copolymer isopropanol telomer wax containing 5.4% acrylic acid as a comparison.

| Run No. | Catalyst | Ethylene Feed, lbs/hr. | Isopropanol % Based on Ethylene Feed | Acrylic Acid, % | Vinyl Acetate, % | Production Rate, lbs/hr. | Conversion, % | Acid No. | Viscosity, cps. | Hardness 0.1 mm |
|---|---|---|---|---|---|---|---|---|---|---|
| 1 | t-butyl peracetate | 2.39 | 22.5 | 3.8 | 4.13 | 1.49 | 62 | 43.5 | 350–400 | 4.2 |
| 2 | " | 2.45 | 23 | 3.8 | 6.1 | 1.35 | 60 | 40 | 450 | 6.6 |
| 3 | " | 2.0 | 21 | 3.6 | 7.5 | 1.30 | 65 | 43 | 250 | 11.0 |
| 4 | " | 2.26 | 18.5 | 3.9 | 8.1 | 1.46 | 65 | 40 | 335 | 9.5 |
| 5 | di-t-butyl peroxide | 1.7 | 18 | 3.7 | 9 | 1.1 | 61 | 41 | 500 | 16 |

EXAMPLE 3

Terpolymers of the invention as prepared in Example 2 were emulsified by melting 40 parts of the wax together with 10 parts of a surfactant of an ethoxylated oleyl alcohol containing 20 ethoxy units per mol of alcohol, 1 part of potassium hydroxide, 2 parts of ethylene glycol and 4 parts of diethylaminoethanol. This mixture was poured into 155 parts of hot water. The unadjusted pH of the resultant clear emulsion was 8.7.

Clarity of the emulsions was measured by noting optical density or % transmission on a Klett-Summerson Initial clarity of the emulsion was 10. The results of polish stability tests are given below:

| | pH | | | | | |
|---|---|---|---|---|---|---|
| | 8.0 | | 8.7 | | 9.5 | |
| | initial | final | initial | final | initial | final |
| | 40 | 56 | 41 | >500 (a) | 40 | (b) |

(a) after 21 days
(b) separated after 7 days

It is apparent that the terpolymer polishes of the invention have increased stability over copolymer polishes.

In addition to good clarity and emulsion stability, several other properties are required for commercially acceptable floor polishes, including good heel marking, soil, water and slip resistance, high gloss and leveling ability.

EXAMPLE 5

The general method for applying polish formulations is as follows:

A specified amount of polish is applied to a new, cleaned (scouring powder and water) 9×9 inch tile with a 3×¾ inch piece of four ply cheesecloth folded to a size of about ¾ × ¾ inch. The polish is poured onto the center of the tile to be coated, the cheese cloth allowed to absorb as much as possible of the polish which is distributed evenly over the surface of the tile, first with up and down strokes, then with crosswise strokes, using minimum pressure. Detailed descriptions of the tests are given below:

Gloss

A 1.5 ml. quantity of the polish to be tested is spread over one half of a tile, and the same amount of a control polish is spread over the other half. After the polishes have dried at room temperature, the levels of gloss of the two are compared by visual examination. A variety of substrates is used when appraising gloss to insure a representative sampling and overcome such substrate variables as porosity.

Leveling

A 1.5 ml. quantity of the polish to be tested is applied and spread over one half of a black vinyl tile. Immediately after the spreading operation is completed, and X is placed in the wet polish surface by drawing the cheesecloth applicator diagonally from corner to corner of that side. After the film has dried, it is examined visually to determine the extent of disappearance of the X. Leveling is rated on the following scale: Excellent — no X perceptible; Very Good — faint outline of the X observable through slight gloss difference, but no ridges in film; Good — plain outline, no ridges; Fair to Poor -apparent ridges.

Water Resistance

Two ml. of the polish to be tested is applied to one half of a black Official Test Linoleum Tile. When the polish is dry, four crayon (China-Marker) circles 2½ inches in diameter are scribed on the coated surface. One hour after the tile is coated, 9 drops of water are deposited in the top circle and the sample is allowed to stand for one hour at room temperature. At the end of this period the wet polish film under the water spot is examined for whitening and the polish is given a wet rating from Excellent (no change from original appearance) through Poor (white). The water spot is then blotted dry with absorbent paper and the sample is allowed to stand for another 30 minutes. After this period, the polish within the circle is examined again to note the degree of recovery from whitening. The polish is given a dry rating for water resistance on the following scale: Excellent - no water mark or perceptible damage to polish; Very good — faint water outline; Good — slight degree of film whitening; Fair — film whitening with some blisters and lifting; Poor — complete film failure with gross whitening and loss of adhesion.

Recoatability

A coat of 1.5 ml. of polish is applied to one half of a tile. One hour later another 1.5 ml. of polish is applied over the first. While the second coat is being spread, observations are made to determine degree of drag on the cheesecloth and occurrence of any whitening of the first coat. After the second coat has dried, the surface is examined visually and evaluated for second-coat gloss, leveling and redispersion. A variety of substrates is used in this test.

Black Heel Mark Resistance

A white Official Test Vinyl-Asbestos Tile is dipped into the polish to be tested, placed in a vertical position on a cheesecloth pad to drain, and permitted to continue drying in that position for 2 hours. After a second coat has been applied in the same way, the tile is stood on its opposite edge and dried overnight. The test is carried out in the Snell Accelerated Soiling Capsule, a motor-driven, rotating hexagonal box whose six sides can be replaced with tile test panels. The Capsule, containing six black rubber cubes, is rotated at 50 rpm for 2½ minutes in each direction. Performance of the polish may be rated Excellent through Poor by comparing its appearance with photographic standards for heel mark resistance.

Slip Resistance

Tiles are coated by immersing them in polish for 1 minute, then standing them vertically on a cheesecloth pad and permitting them to dry at room temperature for two hours. A second coat is applied in the same manner and dried overnight with the tile draining in the opposite direction. The polishes are evaluated by placing a piece of paper on the polish surface and testing slip under the shoe.

In the above tests, the following evaluation code was employed:

| | |
|---|---|
| excellent | 3.6 – 4.0 |
| very good | 3.1 – 3.5 |
| good | 2.6 – 3.0 |
| fair | 2.1 – 2.5 |
| poor | 1.6 – 2.0 |
| very poor | 1.5 |

| Test | | Wax Polishes[a] | | Non-Wax[b] Polish |
|---|---|---|---|---|
| | | Run No. 1 | Ex. 4 | |
| Gloss | | 3.4 | 3.2 | 3.0 |
| Leveling | | 3.3 | 2.7 | 2.8 |
| Water Resistance (30 minutes) | | 2.7 | 3.1 | 2.5 |
| Recoatability | | 2.5 | 2.8 | 3.5 |
| Black Heel Mark Resistance | | 2.9 | 3.0 | 2.5 |
| Soil Resistance | | 2.5 | 2.5 | 2.2 |
| Slip Resistance, | Initial | 3.1 | 3.1 | 3.9 |
| | Final | 2.5 | 2.5 | 2.0 |

[a] prepared as in Example 3
[b] Future

EXAMPLE 6

Several emulsions were prepared following the procedure of Example 3 except varying the surfactant and adding 198 parts of water. The surfactant designated A is an ethoxylated oleyl alcohol containing 6 ethoxy units per mol of alcohol whereas the surfactant designated B contains 40 ethoxy units per mol of alcohol. The compositions and clarity data are given below:

| Terpolymer | Surfactant, Parts | | Optical Density |
|---|---|---|---|
| | A | B | |
| Run 1 | 5.9 | 4.1 | 53 |
| | 2.9 | 7.1 | 87 |
| | — | 10.0 | 41 |
| Run 2 | 5.9 | 4.1 | 175 |
| | 2.9 | 7.1 | 80 |
| | — | 10.0 | milky |
| Run 4 | 5.9 | 4.1 | 119 |
| | 2.9 | 7.1 | 335 |
| | — | 10.0 | 315 |

We claim:

1. A terpolymer telomer wax of ethylene containing from 2 to 7 mol % of acrylic acid and 0.5 to 8 mol % of vinyl acetate, both based on mols of ethylene having a molecular weight between about 2000 and 5000 and viscosity of from about 100 to 1500 centipoises at 140°C.

2. A terpolymer according to claim 1 wherein the telomer is derived from isopropanol.

3. A terpolymer according to claim 1 wherein the acrylic acid content is from 3–4 mol %.

4. A terpolymer according to claim 3 wherein the vinyl acetate content is from 3–5 mol %.

5. A terpolymer according to claim 4 wherein the telomer is derived from isopropanol.

6. A terpolymer according to claim 5 wherein the viscosity is from about 200 to 600 centipoises at 140°C.

7. An aqueous emulsion containing the terpolymer of claim 1.

8. An aqueous emulsion containing the terpolymer of claim 4.

9. An aqueous emulsion containing the terpolymer of claim 5.

* * * * *